United States Patent [19]
Burmenko

[11] Patent Number: 5,655,035
[45] Date of Patent: Aug. 5, 1997

[54] DIFFERENTIAL FIBER OPTIC ANGULAR RATE SENSOR FOR MINIMIZING COMMON MODE NOISE IN THE SENSOR OUTPUT

[75] Inventor: Mark Burmenko, Fair Lawn, N.J.

[73] Assignee: AlliedSignal Inc., Morristown, N.J.

[21] Appl. No.: 559,326

[22] Filed: Nov. 16, 1995

[51] Int. Cl.⁶ .................................................. G02B 6/12
[52] U.S. Cl. ........................... 385/12; 385/15; 385/14; 356/350
[58] Field of Search .......................... 385/12, 14–15, 385/27, 39; 356/350

[56] References Cited

U.S. PATENT DOCUMENTS 4,786,172  11/1988  Zomick .................................. 356/350
4,881,817  11/1989  Kim et al. ............................ 356/350
5,157,461  10/1992  Page .................................... 356/350
5,260,768  11/1993  Cordova et al. ..................... 356/350
5,331,404   7/1994  Moeller et al. ..................... 356/350
5,457,532  10/1995  August et al. ...................... 356/350

Primary Examiner—Rodney B. Bovernick
Assistant Examiner—Ellen Eunjoo Kang
Attorney, Agent, or Firm—Verne E. Kreger, Jr.

[57] ABSTRACT

A fiber optic optical rate sensor includes two channels, each of which provides an angular rate signal, and a light source common to the two channels. The channels are oriented in opposite directions whereby the angular rate signals are added and noise signals are subtracted. The output of the sensor is the result of the subtraction of the outputs of the two channels whereby common mode noise is minimized.

9 Claims, 2 Drawing Sheets

DIFFERENTIAL FIBER OPTIC ANGULAR RATE SENSOR FOR MINIMIZING COMMON MODE NOISE IN THE SENSOR OUTPUT

BACKGROUND OF THE INVENTION

This invention relates generally to fiber optic angular rate sensors and, more particularly, to a fiber optic angular rate sensor arrangement whereby common mode noise is minimized.

The most significant sources of noise in the output of a fiber optic angular rate sensor (gyroscope) are common mode noise (CMN) and shot noise. Shot noise is generated in photodetectors included in the system and is proportional to the square root of the light power at the input to the photodetectors.

Common mode noise has a major component which is a light source intensity noise. It is proportional to the light power and when the light power to the photodetectors exceeds approximately ten μW, common mode noise is the most significant component of the total noise in the sensor output.

Common mode noise minimization is achieved by the present invention.

SUMMARY OF THE INVENTION

This invention contemplates a differential fiber optic angular rate sensor arrangement for minimizing common mode noise, wherein light from a light source is split equally by a directional coupler into two channels. Each channel includes a phase modulator which is driven by a signal from a processor. The difference between the channels is that the clockwise and counterclockwise axes of a fiber optic coil are reversed. That is to say, the vertical rotational axes of the channels are in opposite directions. Therefore, the error signals at the outputs of the channels are opposite in polarity. With an arrangement of the type described, minimization of common mode noise which has a major light source intensity component, power supply noise and electronic noise signals in both channels do not depend on the phase of the light from the light source and therefore have the same polarity and amplitudes. A processor subtracts the rate outputs of both channels, i.e. the absolute values of the useful signals are added but the absolute values of the noise signals are subtracted so that the common mode noise is minimized.

DETAILED DESCRIPTION OF THE INVENTION

Figure 1:
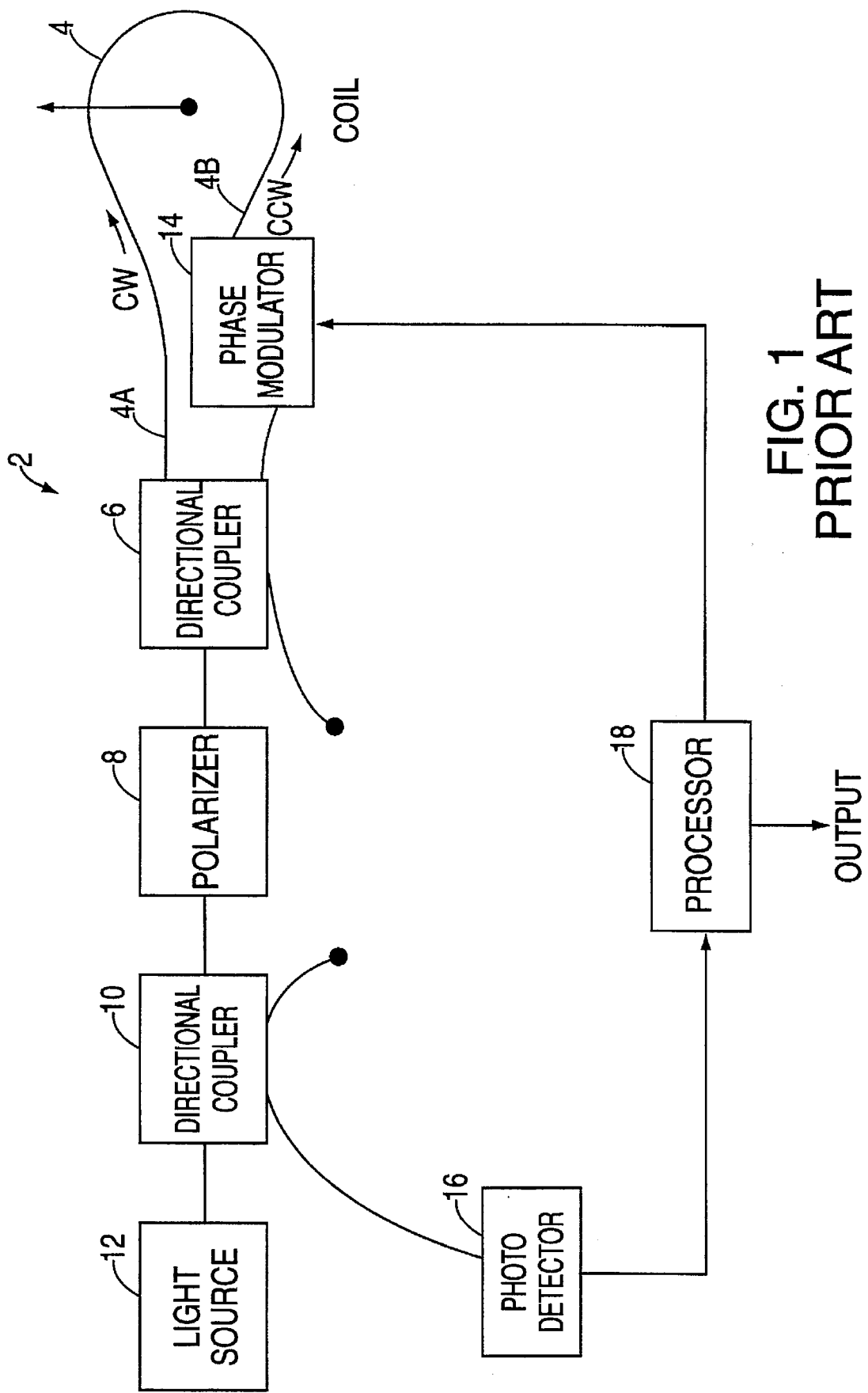
FIG. 1 is a block diagram of a typical prior art fiber optic angular rate sensor.

FIG. 1 illustrates a prior art fiber optic angular rate sensor (gyroscope) designated by the numeral 2. Sensor 2 includes a fiber optic coil 4 having an end 4A connected through a directional coupler 6, a polarizer 8 and a directional coupler 10 to a photodetector 16. An end 4B of coil 4 is connected through a phase modulator 14 to directional coupler 6 and is connected through a polarizer 8 and directional coupler 10 to a photodetector 16. Photodetector 16 provides an error signal which is applied to a processor 18, and which processor 18 provides a signal which is applied to phase modulator 14. Processor 18 provides an angular rate sensor output which is labeled as "output" in the Figure.

The arrangement is such that a light beam from light source 12 is split into two beams that travel around coil 4 in clockwise (CW) and counterclockwise (CCW) directions, respectively. A phase shift between the clockwise and counterclockwise beams is detected by detector 16 which applies an error signal to processor 18 corresponding to the phase difference between the clockwise and counterclockwise traveling light.

Only as much of angular rate sensor 2 as is necessary to understand the present invention has been illustrated and described with reference to FIG. 1. Fiber optic angular rate sensors or gyroscopes are well known in the art and are described, for example, in the text *The Fiber Optic Gyroscope* by Herve Lefevre, published in 1993 by Artech House, and the article entitled *Fiber Optic Gyro Evolution Concept To Product* written by George A. Pavlath and published in 1992 by the American Institute of Aeronautics and Astronautics.

The angular rate sensor illustrated in FIG. 1 is subject to the aforementioned common mode noise characteristics as will now be discerned.

Figure 2:
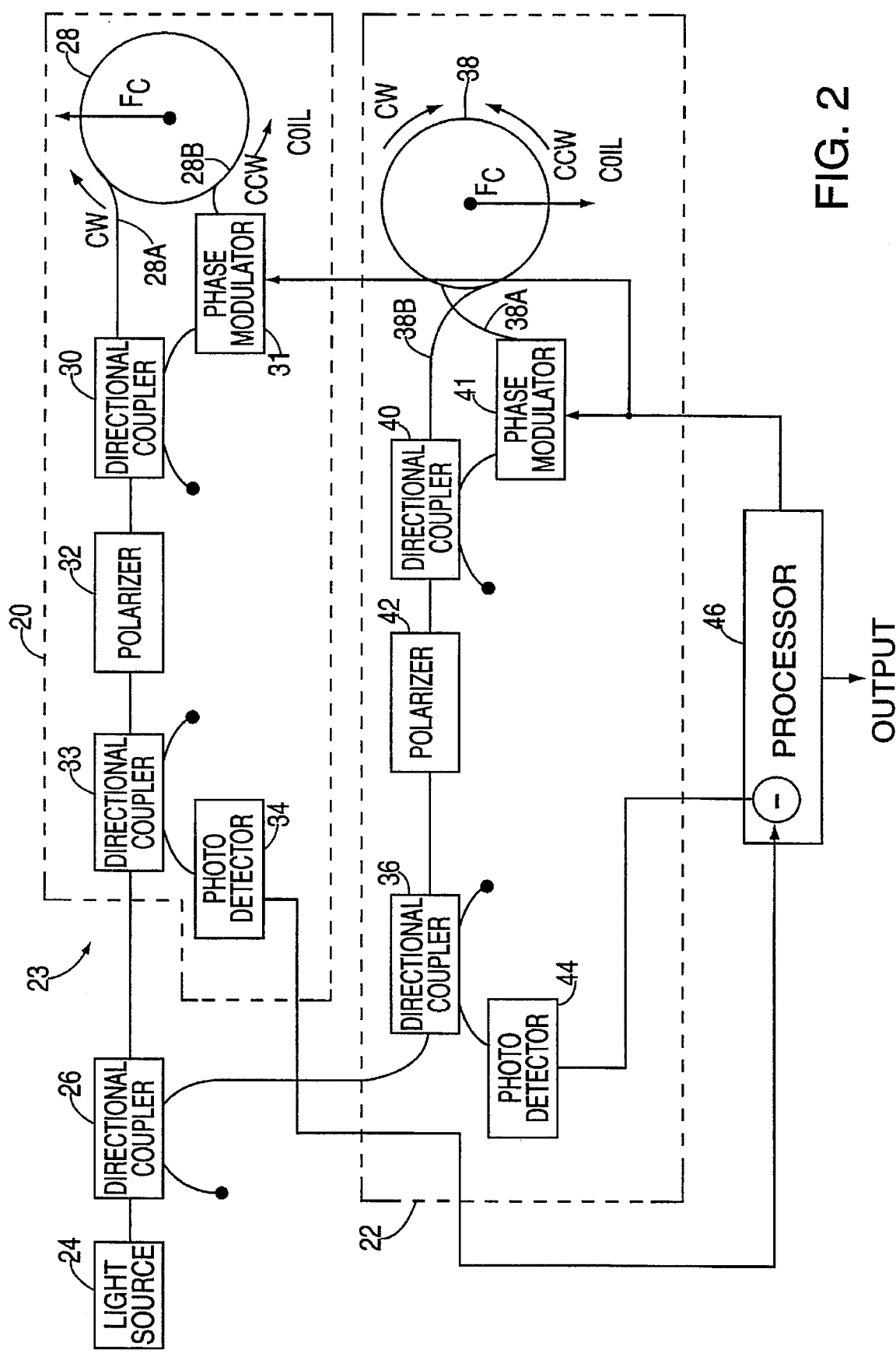
FIG. 2 is a block diagram of an angular rate sensor according to the invention.

FIG. 2 illustrates an angular rate sensor 23 according to the present invention. Angular rate sensor 23 includes a first channel 20, and a second channel 22. A light source 24 and a directional coupler 26 are common to both channels 20 and 22.

Channel 20 includes a fiber optic coil 28 having an end 28A which is connected through a directional coupler 30, a polarizer 32, and a directional coupler 33 to a photodetector 34.

An end 28B of coil 28 is connected through a phase modulator 31 to directional coupler 30 and is connected through polarizer 32 and directional coupler 33 to photodetector 34.

Channel 22 includes a fiber optic coil 38. Coil 38 has an end 38A which is connected through phase modulator 41, a directional coupler 40, a polarizer 42 and directional coupler 36 to photodetector 44 in channel 22. Coil 38 has an end 38B which is connected through a directional coupler 40, polarizer 42 and directional coupler 36 to photodetector 44.

A processor 46 which provides an angular rate sensor output is connected to photodetector 34 in channel 20 and to photodetector 44 in channel 22, whereby the respective signals from channels 20 and 22 are subtracted by the processor. Processor 46 is connected to phase modulator 31 in channel 20 and to phase modulator 41 in channel 22.

It will be seen from FIG. 2 and from the description of the present invention in relation thereto that the output Of light source 24 is equally split by directional coupler 26 into the two channels 20 and 22. Phase modulator 31 in channel 20 and phase modulator 41 in channel 22 are driven by the same signal from processor 46. The error (useful) signals provided by channels 20 and 22 are opposite in polarity. That is to say, the difference between channels 20 and 22 is that the clockwise and counterclockwise flow of light through the respective fiber optic coils 28 and 38 is flipped as designated by the arrows $F_c$. In other words, the vertical rotational axes of channels 20 and 22 are in opposite directions. Therefore, the error (useful) signals at the outputs of the channels are opposite in polarity.

This feature of the invention is best illustrated by considering that in channel 20 of sensor 23 clockwise traveling light passes first through coil 28 and counterclockwise traveling light passes first through phase modulator 31. In channel 22, on the other hand, clockwise traveling light passes first through phase modulator 41 and counterclockwise traveling light passes first through coil 38.

With the arrangement described, minimization of common mode noise which has a major light source intensity component, power supply noise and electronic noise signals in both channels do not depend on the phase of the light from light source 24 and therefore have the same polarity and even the same amplitude. Processor 46 subtracts the rate outputs from both channels, i.e. the absolute values of the useful channels are added but the absolute values of the noise signals are in reality subtracted and thus minimized.

With the above description of the invention in mind, reference is made to the claims appended hereto for a definition of the scope of the invention.

What is claimed is:

1. In a fiber optic angular rate sensor of the type wherein light from a light source travels around a fiber optic coil in clockwise and counterclockwise directions, and an error signal is provided corresponding to the phase difference between the clockwise and counterclockwise traveling light, an arrangement for minimizing common mode noise in the sensor output comprising:

means for equally splitting the light from a common light source into two channels, each of which channels includes a fiber optic coil, whereby the split light travels around the respective coils in clockwise and counterclockwise directions;

means for detecting the traveling light and for providing an error signal corresponding to the phase difference between the clockwise and counterclockwise traveling light, said error signal corresponding to a sensed angular rate;

means for reversing the direction of the clockwise and counterclockwise traveling light in one of the channels relative to the other channel, whereby the vertical rotational axes of the two channels are in opposite directions for minimizing common mode noise; and means for adding the absolute values of the useful angular rate signals from each of the channels and subtracting the absolute values of noise in said angular rate signals, whereby common mode noise in the angular rate sensor output is minimized.

2. An arrangement as described by claim 1, wherein the means for reversing the direction of the clockwise and counterclockwise traveling light in one of the channels includes:

each of the channels including a directional coupler and a phase modulator connected to the fiber optic coil in the respective channel;

in one of the channels the clockwise traveling light passes through the respective phase modulator and the counterclockwise traveling light passes through the respective directional coupler; and in the other of the channels the clockwise traveling light passes through the respective directional coupler and the counterclockwise traveling light passes through the respective phase modulator.

3. An arrangement as described by claim 1, wherein:

the error signals at the outputs of said channels are opposite in polarity.

4. An arrangement as described by claim 1, wherein the means for equally splitting the light from a common light source into first and second channels includes:

a directional coupler connected to the common light source.

5. A fiber optic angular rate sensor, comprising:

a light source;

means for equally splitting the light from the light source into two channels;

each of the channels including a fiber optic coil, whereby the split light travels around the respective coils in clockwise and counterclockwise directions;

means for reversing the direction of the light traveling around the fiber optic coil in one channel with respect to the light traveling around the fiber optic coil in the other channel, whereby the vertical rotational axes of the channels are in opposite directions so that the output of the angular rate sensor has minimized common mode noise;

means for detecting the light traveling around the respective coils and for providing an error signal corresponding to a sensed angular rate; and means for adding the absolute values of the useful angular rate signals from each of the channels and subtracting the absolute values of noise in said angular rate signals, whereby common mode noise in the angular rate sensor output is minimized.

6. An arrangement as described by claim 5, wherein:

the error signal corresponds to the phase difference between the clockwise and counterclockwise traveling light.

7. An arrangement as described by claim 5, wherein the means for equally splitting the light from the light source into two channels includes:

a directional coupler connected to the light source.

8. A method for sensing angular rate, comprising:

transmitting light from a light source;

equally splitting the transmitted light into two channels;

the split light traveling in clockwise and counterclockwise directions around a fiber optic oil in each of the channels;

reversing the direction of light traveling around the fiber optic coil in one channel with respect to the other channel whereby the vertical rotational axes of the channels are in opposite directions;

detecting the traveling light and providing an error signal corresponding to a sensed angular rate which has minimized common mode noise; and adding the absolute values of the useful angular rate signals from each of the channels and subtracting the absolute values of noise in said angular rate signals for minimizing common mode noise in the angular rate sensor output.

9. A method as described by claim 8, including:

providing the error signal so that said signal corresponds to the phase difference between the clockwise and counterclockwise traveling light.

* * * * *